Nov. 13, 1951     C. H. MILLER     2,574,653
ADJUSTABLE STOP FOR POWER TOOLS
Filed Jan. 16, 1950
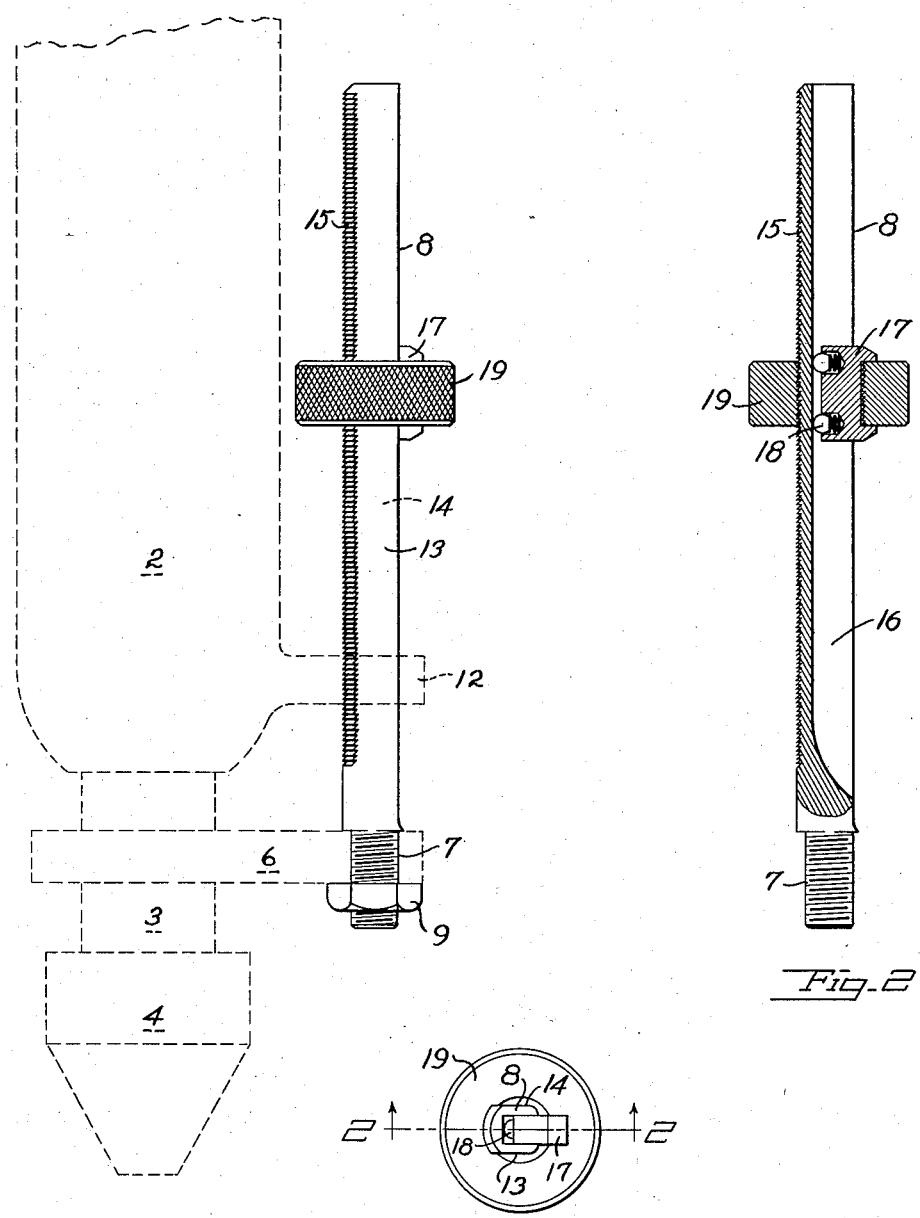
INVENTOR
CLARENCE H. MILLER
BY
Charles S. Evans
his ATTORNEY Patented Nov. 13, 1951

2,574,653

UNITED STATES PATENT OFFICE 2,574,653

ADJUSTABLE STOP FOR POWER TOOLS

Clarence H. Miller, Menlo Park, Calif.

Application January 16, 1950, Serial No. 138,835

2 Claims. (Cl. 77—34.5)

My invention relates to a stop for power tools; and one of the objects of the invention is the provision of a stop that may be quickly moved to approximately the position desired and then by a turn or two set accurately.

My invention possesses other objects and features of advantage, some of which, with the foregoing, will be set forth in the following description of that form of the invention which is illustrated in the drawings. It is to be understood that the invention is not limited to this single embodiment, but may be included in a plurality of forms as set forth in the claims.

Referring to the drawings:

Figure 1 is a front elevation of the stop of my invention mounted on a conventional drill press, the drill press being shown in dash lines. Figure 2 is a vertical sectional view, partly in elevation, taken in the plane indicated by the line 2—2 of Figure 3; and Figure 3 is a plan view of my adjustable stop.

In many power tools, it is necessary to limit the forward travel of a bit-carrying part, and this is conventionally done by mounting on the part a threaded spindle carrying an adjustable nut, so that the nut engages a fixed lug on the tool at a predetermined point and prevents further forward movement. While such a rig makes it possible to repeat an operation many times with great accuracy, it has a serious objection in that considerable time is wasted when operations are such that the nut must frequently be shifted along the spindle. The threads of the spindle are customarily about 20 pitch and the nut must therefore be rotated twenty times to advance it one inch. Many times it is necessary to shift the nut four or five inches. In my quick adjustment stop, I have provided a nut which by simple lateral pressure is disengaged from the spindle, whereupon it may be instantly moved from one end of the spindle to the other to an approximation of the desired position. When the lateral pressure is released, the nut again engages the spindle; and a turn or two places it exactly in the required position.

The travel of the carriage on a lathe, or of the quill and spindle of a drill press are commonly limited by the conventional stops such as I have referred to. For purposes of explanation, I have shown my quick adjustment stop as applied to a small drill press, the outline of a portion of which is shown in dash lines.

Referring first to Figure 1, the drill press head 2, houses the quill 3 in which the spindle carrying the chuck 4 is journaled. Extending from the quill is the bracket arm 6, in the end of which the threaded end 7 of the spindle 8 is secured by the lock nut 9. The spindle extends upwardly in parallelism with the head 2, passing between the sides of the bifurcated lug 12 which extends outwardly from near the lower part of the head.

The spindle is of peculiar form, having two opposite flat sides 13 and 14. A third side joining the flat sides is of cylindrical shape having preferably buttress threads 15 extending from the upper end of the spindle nearly to the mounting bracket. In the fourth side, opposite the threads, a groove 16 is milled coextensive with the threads.

Seated in the groove and slidable therein is a shoe 17 in which spring-pressed balls 18 are arranged normally to press the shoe outwardly. Surrounding the spindle and shoe, and slidably interlocked with the shoe as shown in Figure 2, is the nut 19 internally threaded to work with the threads of the spindle.

It is important to note that the minimum diameter of the internal threads of the nut is such that the maximum transverse movement of the nut as permitted by the seating of the shoe in its groove, is sufficient to disengage the nut threads from the spindle threads. At this time the nut is movable bodily and without rotation along the spindle to a new position approximating the desired exact position. Upon release of the lateral pressure on the nut, the spring-pressed balls under the shoe re-establish the position of the nut on the spindle as shown in Figures 1 and 2, with the threads of the nut and spindle engaged. Accurate small adjustment of the nut up or down on the spindle is then made by rotation of the nut through a few turns.

While the nut is readily turned by the fingers, frictional resistance to turning effected by the springs between the shoe and the bottom of the groove maintain the nut in the adjusted position, their being no rotative component, in the pressure of engagement of the lug 12 by the nut, sufficient to disturb the adjustment.

I claim:

1. An adjustable stop for a power tool comprising a spindle having flat opposite sides and one intervening side having threads thereon and a second intervening side having a longitudinal groove therein, a shoe in the groove, a nut surrounding the spindle and slidably interlocked with the shoe, said nut having internal threads to work with the threaded side of the spindle, the minimum diameter of the internal threading being sufficient for transverse movement of the nut on the spindle to disengage the nut threads from the spindle threads, and spring means interposed between the shoe and spindle.

2. An adjustable stop for a power tool comprising a spindle having smooth opposite sides and one intervening side having threads thereon and a second intervening side having a longitudinal groove therein, a nut surrounding the spindle and having threads normally engaging the spindle threads, the minimum diameter of the nut threads being sufficient for transverse movement of the nut on the spindle to disengage the nut threads from the spindle threads, a shoe interlocked with the nut and interposed between the nut and spindle and longitudinally slidable in the groove, and spring means interposed between the shoe and spindle for resiliently holding the threads of the nut in engagement with the threads of the spindle and allowing their selective disengagement.

CLARENCE H. MILLER.

REFERENCES CITED

The following references are of record in the file of this patent:

UNITED STATES PATENTS

| Number | Name | Date |
| --- | --- | --- |
| 967,899 | Golden | Aug. 23, 1910 |
| 2,318,691 | Huthsing | May 11, 1943 |
| 2,490,307 | Karr | Dec. 6, 1949 |